(12) United States Patent  
Nishiji

(10) Patent No.: US 7,097,585 B2
(45) Date of Patent: Aug. 29, 2006

(54) DIFFERENTIAL GEARING FOR VEHICLE

(75) Inventor: Makoto Nishiji, Kumagaya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 182 days.

(21) Appl. No.: 10/876,188

(22) Filed: Jun. 24, 2004

(65) Prior Publication Data

US 2005/0054472 A1 Mar. 10, 2005

(30) Foreign Application Priority Data

Jun. 26, 2003 (JP) ............................ 2003-183383

(51) Int. Cl.
*F16H 48/10* (2006.01)
*F16H 48/20* (2006.01)

(52) U.S. Cl. ...................................... 475/248; 475/249

(58) Field of Classification Search ................ 475/248, 475/250, 342, 338, 331, 249, 231, 317, 339, 475/340, 341, 320, 321, 322

See application file for complete search history.

(56) References Cited

FOREIGN PATENT DOCUMENTS

| JP | 09-144844 | | 6/1997 |
| JP | 09144844 A | * | 6/1997 |
| WO | WO 3089811 A1 | * | 10/2003 |

* cited by examiner

*Primary Examiner*—Sherry Estremsky
(74) *Attorney, Agent, or Firm*—Thomas B. Ryan; Stephen B. Salai, Esq.; Harter, Secrest & Emery LLP

(57) ABSTRACT

An internal gear 10 is rotatably received within a housing 8 (planetary carrier 2 and case 4), and a sun gear 12 is rotatably disposed on a circle located inside of and concentric with the internal gear 10. Planet gears 14 which are carried within carrying openings 2c formed in a planetary carrier 2 are disposed between the internal gear 10 and the sun gear 12 in meshing engagement with the internal gear 10 and the sun gear 12. The internal gear 10, the sun gear 12 and the planet gears 14 each have spherical gear teeth, and develops a thrust upon occurrence of a relative rotation therebetween. A coupling 16 is connected to the inner periphery of the internal gear 10 through helical splines 10*d* and 16*a* for purpose of power transmission. The helical splines provide a novel thrust generating mechanism, which enlarges the extent in which a bias ratio can be adjusted.

7 Claims, 10 Drawing Sheets

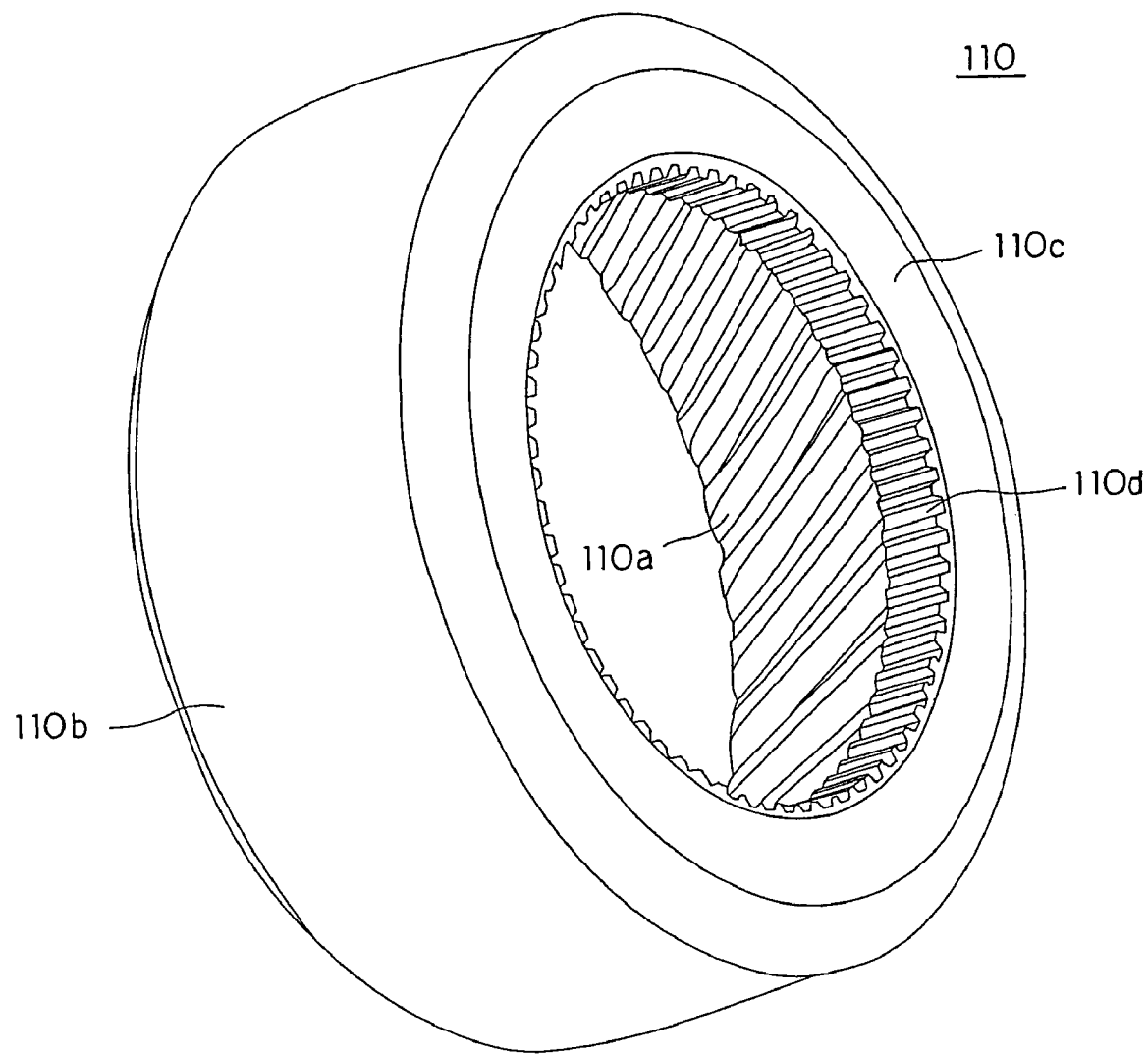

DIFFERENTIAL GEARING FOR VEHICLE

CROSS-REFERENCE TO RELATED APPLICATIONS

This application based upon and claims priority under 35 USC §119 to Japanese patent application No. 2003-183383 filed on Jun. 26, 2003, entire contents of which are incorporated herein by reference.

BACKGROUND OF THE INVENTION AND RELATED ART STATEMENT

The present invention relates to a differential gearing for vehicle, and in particular, to a differential gearing for vehicle of a planetary gear type with a torque responsive differential action limiting function or torque distribution function.

A differential gearing for vehicle of a planetary gear type comprising an internal gear having internal teeth formed around an internal peripheral surface thereof, a sun gear disposed on a circle located inside of and concentric with the internal gear, a plurality of planet gears disposed between the internal gear and the sun gear in meshing engagement with the both gears, and a planetary carrier for carrying the planet gears for rotation about the axis of rotation of the internal gear and the sun gear while permitting the planet gears to rotate about their own axes with an arrangement that a shaft which transmits a drive from an engine is connected to the planetary carrier while the internal gear and the sun gear are connected to front and rear wheels of a four wheel driven vehicle, for example, is known in the art.

FIG. 11 shows an exemplary differential gearing for vehicle of a planetary gear type mentioned above and a conventional differential gearing will be described briefly with reference to FIG. 11. A planetary carrier 102 and a case 104 are secured together to define a housing 108 in which an internal gear 110 is received, and a sun gear 112 is disposed on a circle located inside of and concentric with the internal gear 110. A plurality of planet gears 114, which are carried by the planetary carrier 102, are disposed between the internal gear 110 and the sun gear 112 in meshing engagement with the both gears 110 and 112. In the arrangement shown in FIG. 11, the internal gear 110, the sun gear 112 and the planet gears 114 have helical gear teeth which are in meshing engagement with one another.

While not shown, the planetary carrier 102 has a cylindrical portion which extends into the inside of the internal gear 110 and which is formed with a plurality of openings at a given interval in which the planet gears 114 are received, respectively, in a rotatable manner. When the planet gears 114 rotate about their own axes, the tooth tips thereof slide against the internal surface of the openings.

The internal gear 110 has a cylindrical portion 110b and a flange 110c which extends radially inward from one end (right end as viewed in FIG. 11) of the cylindrical portion 110b. Internal teeth 110a are formed around the inner peripheral surface of the cylindrical portion 110b while splines 110d (see FIG. 13) are formed around the inner peripheral surface of the flange 110c. Splines 110d in the flange 110c are engaged by splines 116a formed around the outer periphery of a coupling 116. The splines 110d and 116a which connect the internal gear 110 and the coupling 116 together to transmit a power have been straight splines which extends parallel to an axis L3 in a conventional arrangement.

Washers 120, 118 and 124 are interposed between one end face (right end face as viewed in FIG. 11) of the coupling 116 which is connected with the internal gear 110 through the straight splines and the internal surface of the case 104, between the other end face of the coupling 116 and the end face of the sun gear 112, and between the other end face of the sun gear 112 and the internal surface of the planetary carrier 102. Washers 128 and 126 are interposed between the external surface (right-hand surface as viewed in FIG. 11) of the flange 110c of the internal gear 110 and the internal surface of the case 104 and between the internal surface of the flange 110c and the tip end face of the planet gears 114.

In the differential gearing for vehicle constructed in the manner mentioned above, a drive from an engine is transmitted to the planetary carrier 102 while one of front and rear wheels of a four wheel driven vehicle is connected to splines 116b formed around the inner periphery of the coupling 116 which is spline-connected to the internal gear 110 and the other wheel is connected to splines 112b formed around the inner periphery of the sun gear 112.

In the differential gearing for vehicle, when an drive from an engine is transmitted, the planetary carrier 102 which carries the planet gears 114 is driven for rotation, and if the vehicle is running straightforward on a good road surface, the planet gears 114 carried by the planetary carrier 102 as well as the internal gear 110 and the sun gear 112 which mesh with the planet gears 114 rotate in an integral manner without a relative rotation therebetween. When cornering, the planet gears 114 carried by the planetary carrier 102 rotate about their own axes, thereby correcting for a differential rotation of the front and the rear drive wheel which are connected to the internal gear 110 and the sun gear 112, respectively.

When the coefficients of friction which the front and the rear wheel experience from the road surface are different to produce a difference in the grip of the front and the rear drive wheel, a torque distribution function or a function to limit the differential action is provided by a frictional force which results from a sliding motion of the tooth tip of the planet gears 114 which are held within the gear holding openings formed in the planetary carrier 102 to rotate against the internal peripheral surface of the openings, and by a frictional force utilizing thrusts resulting from the meshing engagement between the helical gear teeth of the internal gear 110 and the planet gears 114 and the sun gear 112.

For example, when an input from the engine is applied to the planetary carrier 102 while an output from the internal gear 110 is applied to the rear wheel and an output from the sun gear 112 is applied to the front wheel as mentioned previously, it follows that in the drive mode, a thrust (see an arrow A shown in FIG. 11) which results from the meshing engagement between the planet gears 114 and the internal gear 110 acts on the washer 128 disposed on the end of the internal gear 110 located toward the case 104 to produce a frictional force, and a thrust (see an arrow B in the same Figure) which results from the meshing engagement between the planet gears 114 and the sun gear 112 acts on the washer 124 disposed on the end of the sun gear 112 located toward the planetary carrier 102 to produce a frictional force. In this instance, the locations where the frictional forces are developed are limited to the washers 128 and 124, resulting in a low bias ratio (torque distribution ratio) obtained.

During the coasting mode (see FIG. 12), that is a condition of a run by inertia, a thrust (see an arrow C) which results from the meshing engagement between the planet gears 114 and the internal gear 110 acts on the washer 126 located between the internal gear 110 and the planet gears 114 to produce a frictional force, and a thrust (see an arrow D) which results from the meshing engagement between the planet gears 114 and the sun gear 112 acts on the washer 118 disposed between the sun gear 112 and the coupling 116 to produce a frictional force. In addition, a thrust from the sun gear 112 is applied to the intermediate washer 118 to produce a frictional force upon the washer 120 disposed between the coupling 116 and the internal surface of the case 104, thereby allowing a bias ratio to be obtained which is of a median level greater than the bias ratio obtained during the drive mode.

In the differential gearing for vehicle of the prior art which is constructed in the manner mentioned above, an approach is available which adjusts the bias ratio in accordance with the helix angle of the helical gear in order to obtain a bias ratio which is desired depending on the characteristic of the vehicle. However, a manufacturing difficulty is involved in achieving a desired helix angle, and it has been difficult to obtain an optimum bias ratio according to such adjustment approach alone. In particular, in order to improve a limit on the drive and the dynamic behavior of the vehicle, it is necessary to achieve a higher bias ratio, but a sufficiently high bias ratio cannot be obtained with a conventional approach.

At this end, a differential gearing with an arrangement to achieve a high bias ratio (a differential action limiting function) has been proposed (see Japanese Laid-Open Patent Application No. 9-144,844). According to the differential gearing disclosed in this cited Patent Application, a multiple-disk clutch acting as means which intensifies the force limiting the differential action is disposed between the internal gear and the planet gears (which are referred to as pinion gears in the cited Patent Application).

OBJECT AND SUMMARY OF THE INVENTION

In a conventional arrangement as disclosed in the cited Patent Application, even though the function to limit the differential action can be enhanced, there remains a problem that increasing the extent in which the differential action limiting function can be adjusted inclusive of reducing the differential action limiting function can not be achieved.

The present invention has been made in order to solve such problem, and has for its object the provision of a differential gearing for vehicle which is capable of adjusting the differential action limiting function (bias ratio) readily and over a broader extent without introducing a drastic change in the arrangement, which is enabled by the addition of a location or locations where thrusts are developed. It is a specific object of the present invention to provide a differential gearing for vehicle which allows a high bias ratio to be obtained in a ready manner.

Such objects are accomplished in a differential gearing for vehicle comprising a internal gear which is received within a housing, a sun gear disposed on a hypothetical circle located inside of and concentric with the internal gear, planet gears disposed between the internal gear and the sun gear in meshing engagement with the both gears and a planetary carrier for carrying the planet gears in a manner to permit their rotation about the axis of rotation of the internal gear and the sun gear and a rotation about their own axes, by dividing a power transmission path from a region where the internal gear or the sun gear is in meshing engagement with the planet gears into two or more members, and providing a thrust generating mechanism which generates a thrust during the power transmission between the divided members.

In a conventional differential gearing for vehicle of a planetary gear type, the differential action limiting function is achieved by utilizing the friction which results when the tooth tip of the planet gears slides against the inner peripheral surface of the planet gear carrying openings formed in the planetary carrier, and the friction with the various washers which results from the thrusts developed by the meshing engagement between the internal gear, the planet gears and the sun gear. By contrast, in the differential gearing according to the present invention, the internal gear or the sun gear is divided into a plurality of members, and a thrust generating mechanism is provided in a region where the divided members are connected together. Accordingly, an additional thrust can be developed in the connecting region, and the bias ratio, representing the differential action limiting function, can be increased or decreased depending on the direction in which the thrust is directed. In this manner, the extent of the bias ratio which can be established can be broadened. It is to be noted that gears can be used in common among the differential gearings which have different bias performances.

BRIEF DESCRIPTIONS OF THE DRAWINGS

FIG. 13 is a perspective view of the internal gear of a conventional differential gearing for vehicle.

DETAILED DESCRIPTION OF PREFERRED EMBODIMENTS

Figure 1:
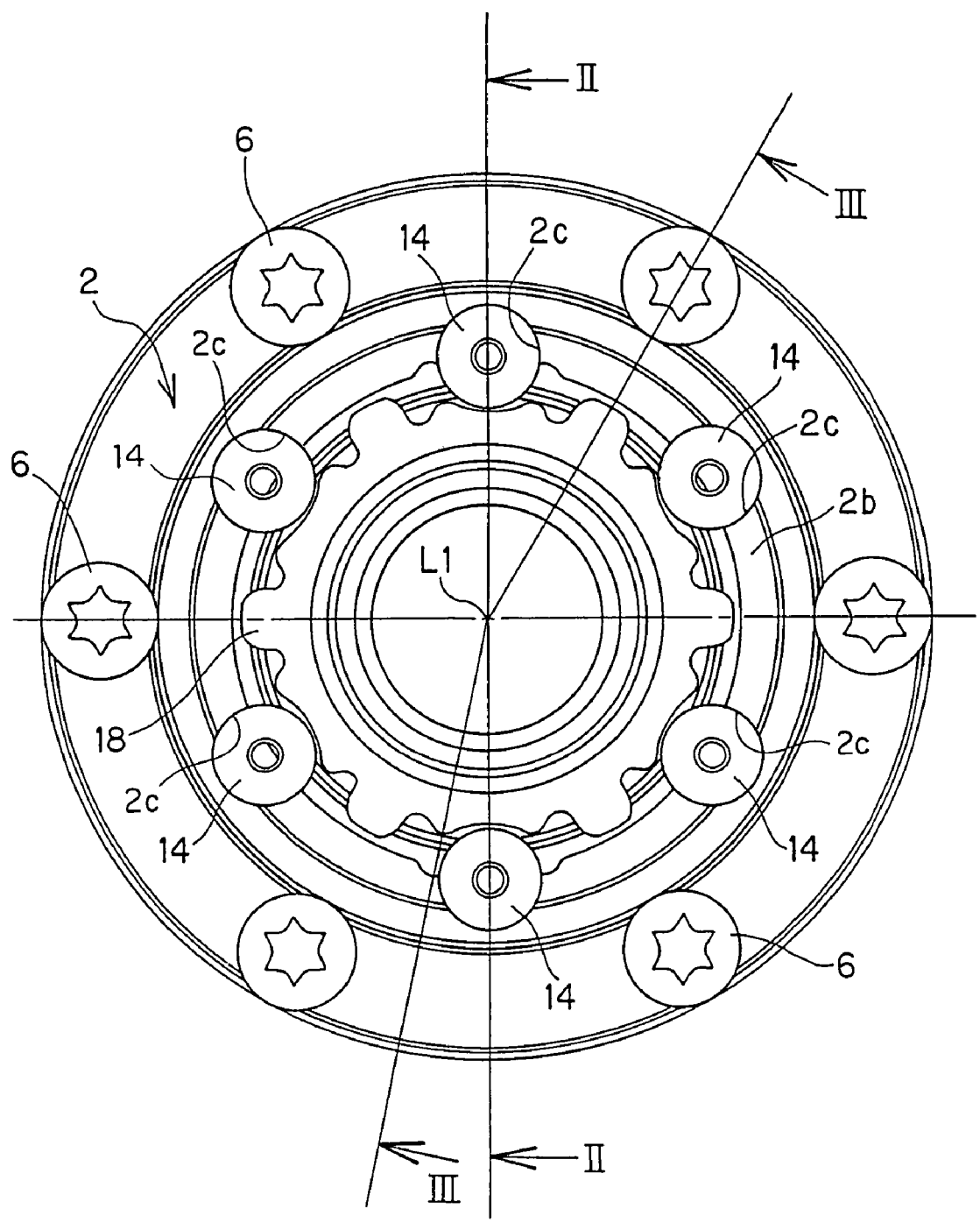
FIG. 1 is a cross section of a differential gearing for vehicle according to one embodiment of the invention.

Several embodiments of the present invention will now be described with reference to the drawings. A differential gearing for vehicle shown contains a planetary gear mechanism including an internal gear 10, a sun gear 12 and planet gears 14 which are carried by a planetary carrier 2 within a housing 8 which is defined by a planetary carrier 2 and a case 4 disposed in abutment against each other and secured together by a plurality of bolts 6.

The internal gear 10 (see FIG. 5) having internal teeth 10a formed around the inner peripheral surface is rotatably fitted inside the housing 8. The sun gear 12 which rotates about the same axis of rotation L1 as the internal gear 10 is disposed inside the internal gear 10, and has teeth 12a formed around an outer peripheral surface thereof. The plurality of planet gears 14 which are carried by the planetary carrier 2 are disposed between the internal gear 10 and the sun gear 12.

Figure 2:
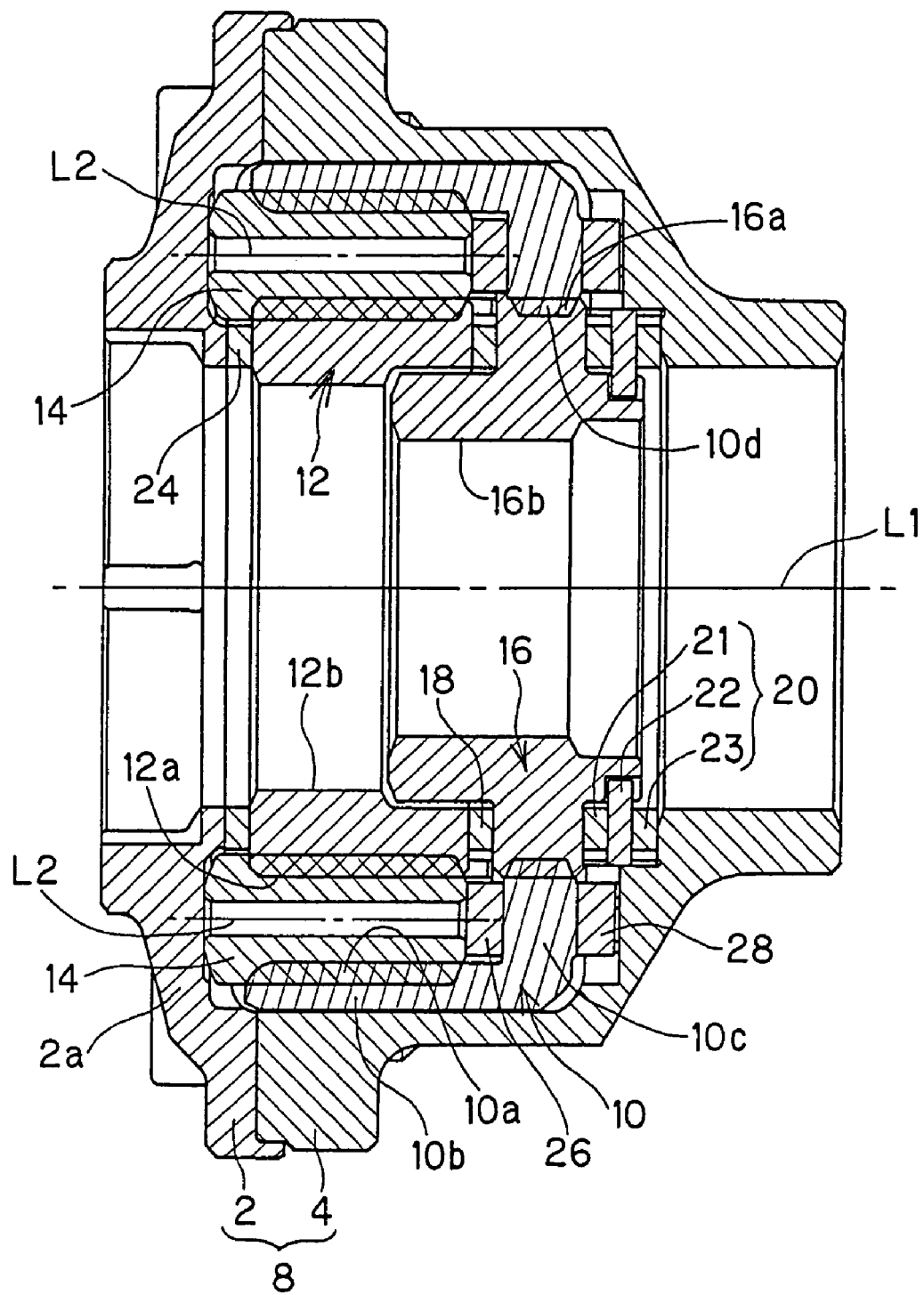
FIG. 2 is a longitudinal section taken along the line II—II shown in FIG. 1.
Figure 3:
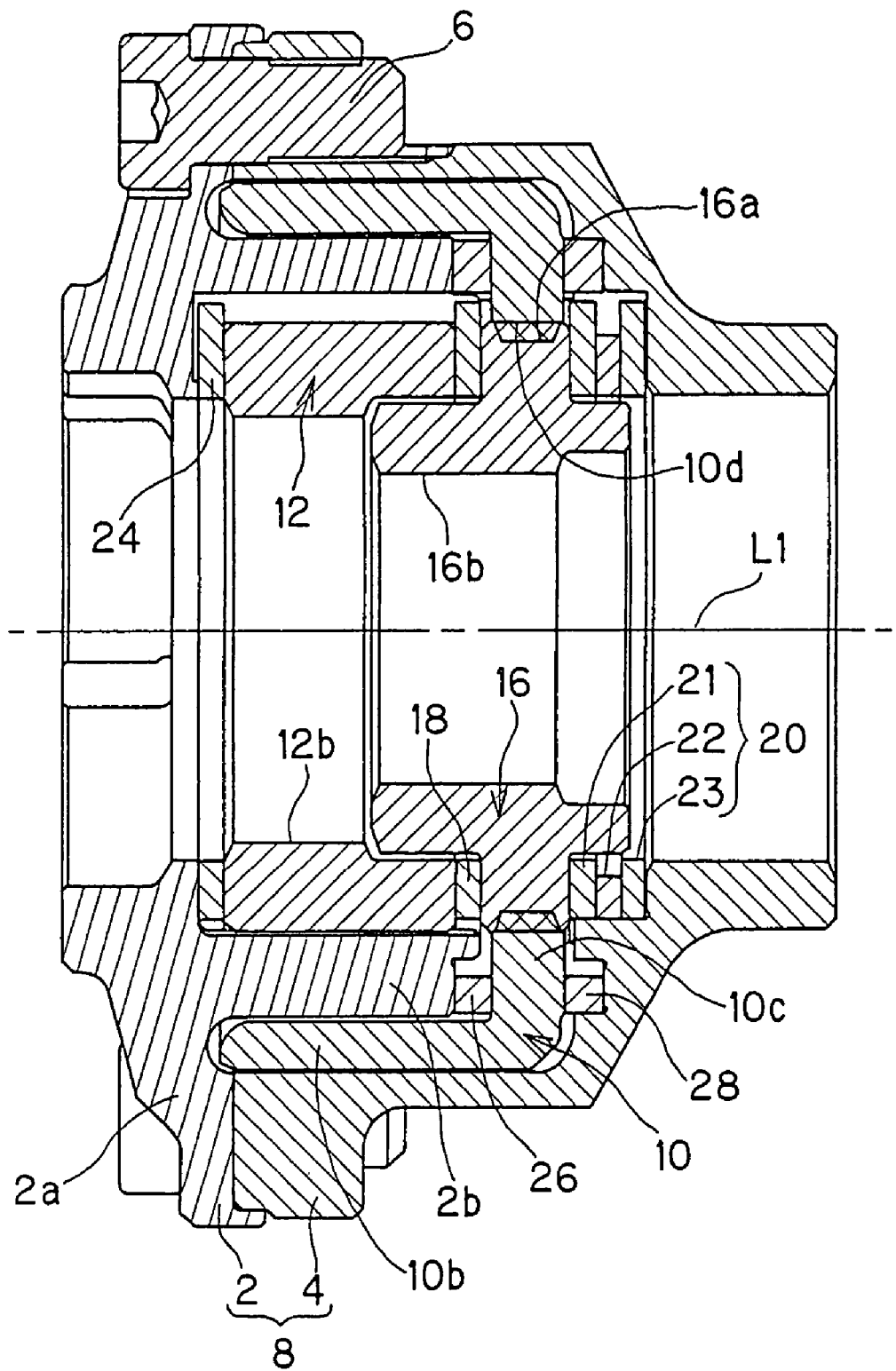
FIG. 3 is a longitudinal section taken along the line III—III shown in FIG. 1.
Figure 4:
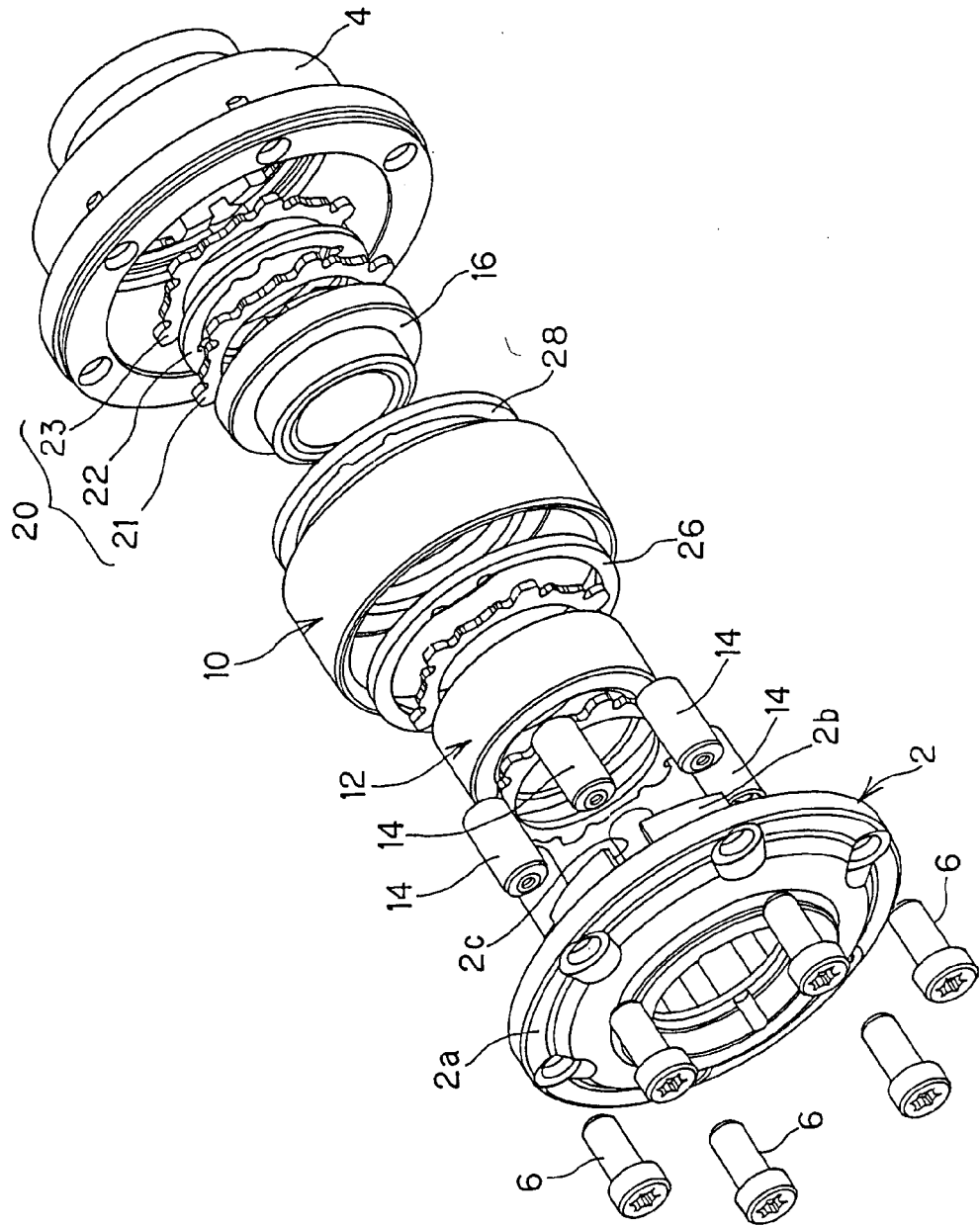
FIG. 4 is an exploded perspective view of the differential gearing for vehicle.

The planetary carrier 2 has a bottom surface 2a defining a wall surface directed toward the front side of a vehicle (the left side, as viewed in FIGS. 2 and 3), and a cylindrical portion 2b which is formed in an upstanding manner from the bottom surface 2a. A plurality of planet gear carrying openings 2c are formed in the cylindrical portion 2b at a given interval, and each of the planet gears 14 is carried in respective planet gear carrying opening 2c, with a tooth tip of the planet gear 14 being disposed in sliding contact with the internal surface of the carrying opening 2c.

The planetary carrier 2 can rotate about the axis of rotation L1 of the internal gear 10 and the sun gear 12 and the planet gears 14 carried within the planet gear carrying openings 2c formed in the planet carrier 2 are arranged such that a center axis L2 of the planet gear 14 can rotate about the axis of rotation L1 of the planetary carrier 2 and each individual planet gear can rotate about the own axis L2 within the planetary gear carrying opening 2c formed in the planetary carrier 2. In this embodiment, the internal gear 10, the sun gear 12 and the planet gears 4 each have helical gear teeth, and each of the planet gears 14 is in meshing engagement with the internal gear 10 which is located on the outside and with the sun gear 12 which is located on the inside.

Figure 5:
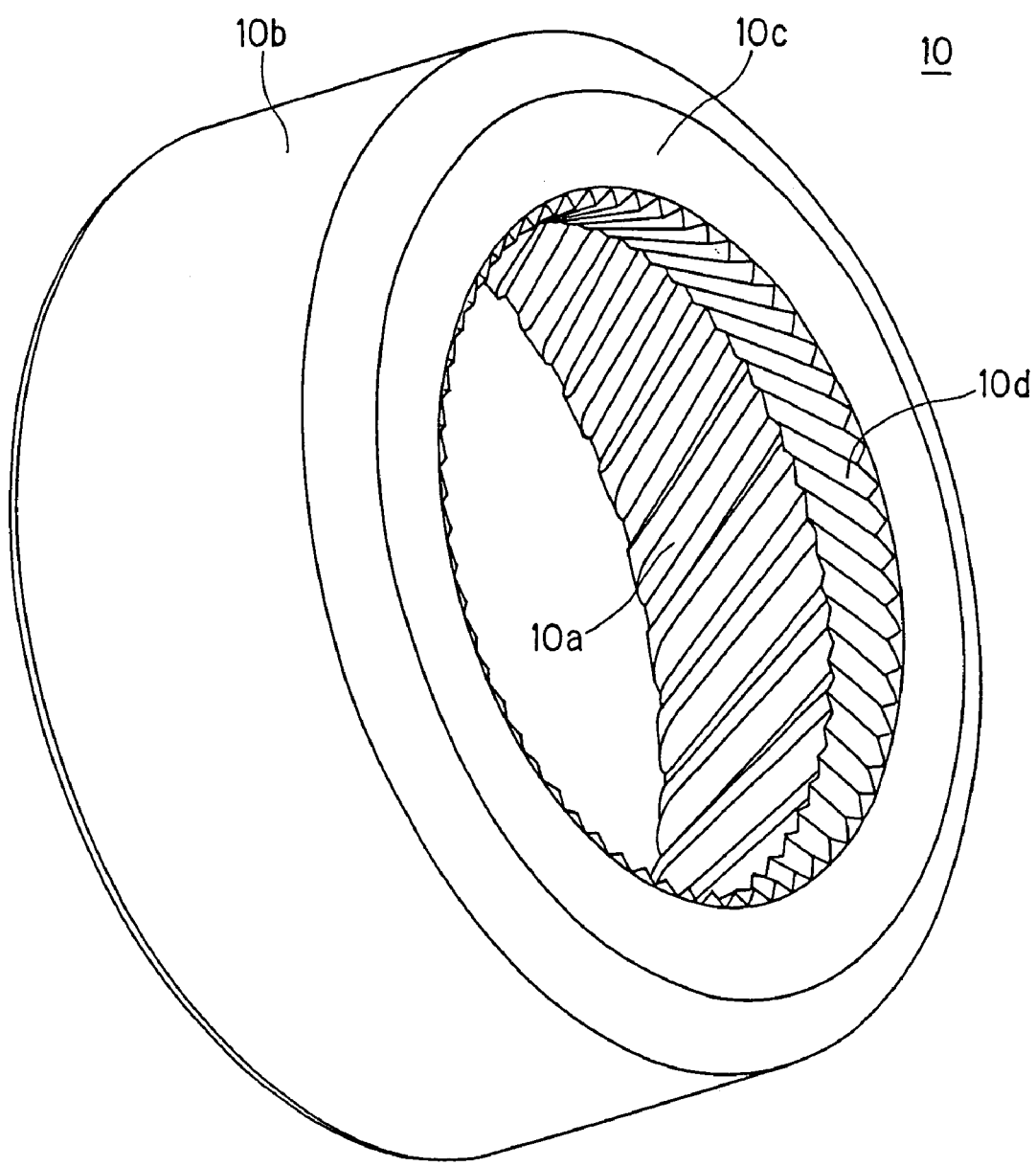
FIG. 5 is a perspective view of the internal gear of the differential gearing for vehicle.

The internal gear 10 has a cylindrical portion 10b and a flange 10c which extends radially inward from one end (right end as viewed in FIGS. 2 and 5) of the cylindrical portion 10b. Internal teeth 10a are formed around the inner peripheral surface of the cylindrical portion 10b, while splines 10d are formed around the inner peripheral surface of the flange 10c. In this embodiment, the splines 10d formed in the internal gear 10 are helical splines which are inclined in the opposite direction from the inclination of the internal teeth 10a, as shown in FIG. 5.

The splines 10d formed in the flange 10c of the internal gear 10 are engaged by helical splines 16a formed around the outer periphery of an internal gear coupling 16. When the helical splines 10d which are inclined in the opposite direction from the inclination of the internal teeth 10a of the internal tooth 10 are in meshing engagement with the helical splines 16a formed around the outer surface of the coupling 16 to transmit the power from the internal gear 10, it is possible to generate an additional thrust, in addition to thrusts which result from the meshing engagement between the internal gear, the planet gears and the sun gear in the prior art arrangement. It should be understood that a thrust generating mechanism which is provided between the internal gear 10 (i.e., one member) and the coupling 16 (i.e., another member) along the path of power transmission is not limited to the meshing engagement between the helical splines 10d and 16a as mentioned above, but may utilize a clutch or a cam.

A washer 18 is interposed between the end face (left end face as viewed in FIGS. 2 and 3) of the coupling 16 and the sun gear 12. A clutch mechanism 20 comprising three washers 21, 22 and 23 is disposed between the opposite end face of the coupling 16 and the internal surface of the case 4. Of these three washers 21, 22 and 23, the washers 21 and 23 which are disposed on the opposite sides are engaged with the internal surface of the housing 8 (specifically, the case 4 which defines the housing 8) to be locked against rotation, while the middle washer 22 is engaged with the coupling 16 for integral rotation therewith. A washer 24 is interposed between the end face of the sun gear 12 and the internal surface of the housing 8 (specifically, the planetary carrier 2 which defines the housing 8).

In addition, washers 26 and 28 are interposed between the planetary carrier 2 and the planet gears 14 on one hand and the internal surface of the flange 10c of the internal gear 10 on the other hand and between the external surface of the flange 10c of the internal gear 10 and the internal surface of the case 4.

In use of the differential gearing for vehicle constructed in the manner mentioned above, a drive from an engine is input from outside the housing 8, the splines (the power transmission path) 16b formed around the inner periphery of the coupling 16 which is splined to the internal gear 10 are connected to the rear wheel of the four wheel driven vehicle, and splines (power transmission paths) 12b formed around the inner periphery of the sun gear 12 are connected to the front wheel of the vehicle.

The operation of the differential gearing for vehicle which includes the planetary gear mechanism as mentioned above will be described assuming that the housing 8 (the planetary carrier 2), the internal gear 10 and the sun gear 12 are connected to the engine of the vehicle, the rear wheel and the front wheel, respectively. When the vehicle is running straightforward on a normal flat road, the front and the rear drive wheel are rotating in the same manner, and accordingly, the internal gear 10, the planet gears 14 and the sun gears 12 remain in their meshing engagement without a relative rotation therebetween, and the entire differential gearing rotates integrally about the axis of rotation L1.

When a differential rotation occurs between the front and the rear drive wheel as when cornering, the planet gears 14 carried by the planetary carrier 2 rotate about the axis of rotation L1 while rotating about the center axis L2, thereby correcting for the differential rotation. Specifically, a differential action is achieved by the rotation of the planet gears 14 about their own axes in response to the differential rotation of the front and the rear drive wheel in a direction in which one of the internal gear 10 and sun gear 12, which are connected to these drive wheels, is accelerated while the other is decelerated.

When there occurs a difference in the grip of the front and the rear wheel when the four wheel driven vehicle is running on a bad road, the differential gearing provides a limitation of the differential action. Specifically, the frictional force developed by thrusts which results from the meshing engagement between the gears 10, 12 and 14 and the friction which occurs between the tooth tip of the planet gears 14 and the inner peripheral surface of the carrying openings 2c in the planetary carrier 2 in which the planet gears are carried are effective to decrease the rotating force applied to the idling drive wheel while imparting the torque which is equivalent to the reduction directly to a higher traction drive wheel, thus providing a torque distribution function or the differential action limiting function.

More specifically, when one of the drive wheels slips, the planet gears 14 which are in meshing engagement with the internal gear 10 and the sun gear 12 rotate about their own axes. Because the internal gear 10, the sun gear 12 and the planet gears 14 each have helical gear teeth, when a relative rotation occurs therebetween, an axial thrust is developed. For example, during the drive mode, a relative rotation between the internal gear 10 and planet gears 14 produces a thrust as indicated by an arrow A in FIG. 6, and because a power transmission occurs between the internal gear 10 and the coupling 16 through the meshing engagement between the helical splines 10*d* and 16*a*, a thrust (see an arrow E shown in FIG. 6) acting upon the internal gear 10 in the same direction as the thrust mentioned above is developed. As a result of such thrusts, the washer 28 disposed between the external surface of the flange 10*c* of the internal gear 10 and the internal surface of the case 4 is subject to a frictional force.

Figure 6:
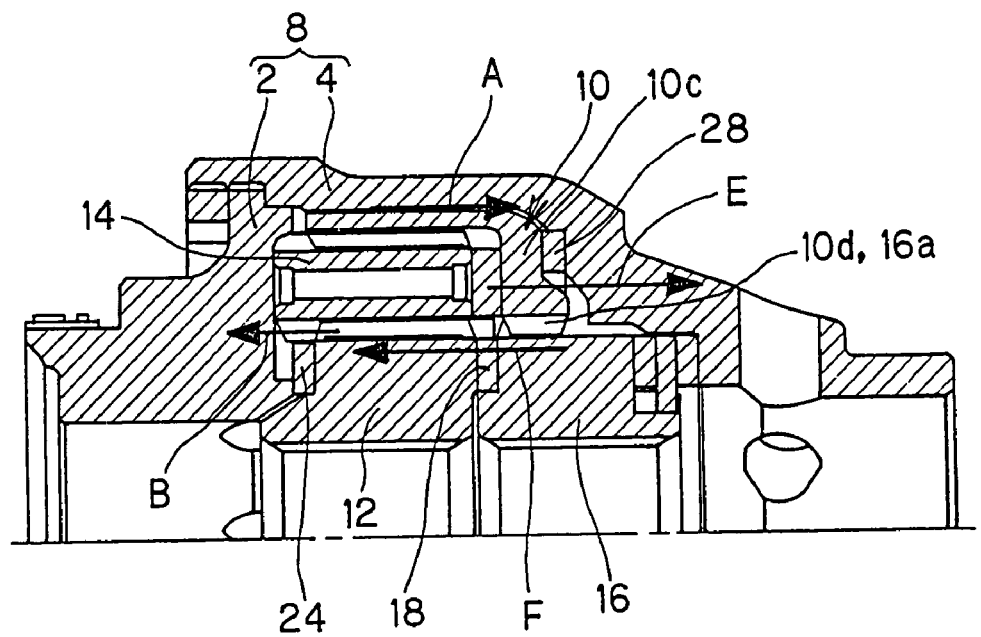
FIG. 6 is a longitudinal section illustrating locations in the differential gearing for vehicle according to the embodiment where thrusts are developed during the drive mode and directions in which the thrusts act.

On the other hand, as a reaction to the meshing engagement between the internal gear 10 and the coupling 16, a thrust indicated by an arrow F in FIG. 6 acts upon the coupling 16. The thrust F acts on the washer 18 disposed between the coupling 16 and the sun gear 12, and also acts on the washer 24 disposed between the sun gear 12 and the planetary carrier 2 together with a thrust B which results from the meshing engagement between the planet gears 14 and the sun gear 12, thus developing a frictional force. In this embodiment, the power transmission through the helical splines 10*d* and 16*a* between the internal gear 10 and the coupling 16 adds thrusts E and F, allowing a higher bias ratio to be obtained as compared with the conventional arrangement.

Figure 7:
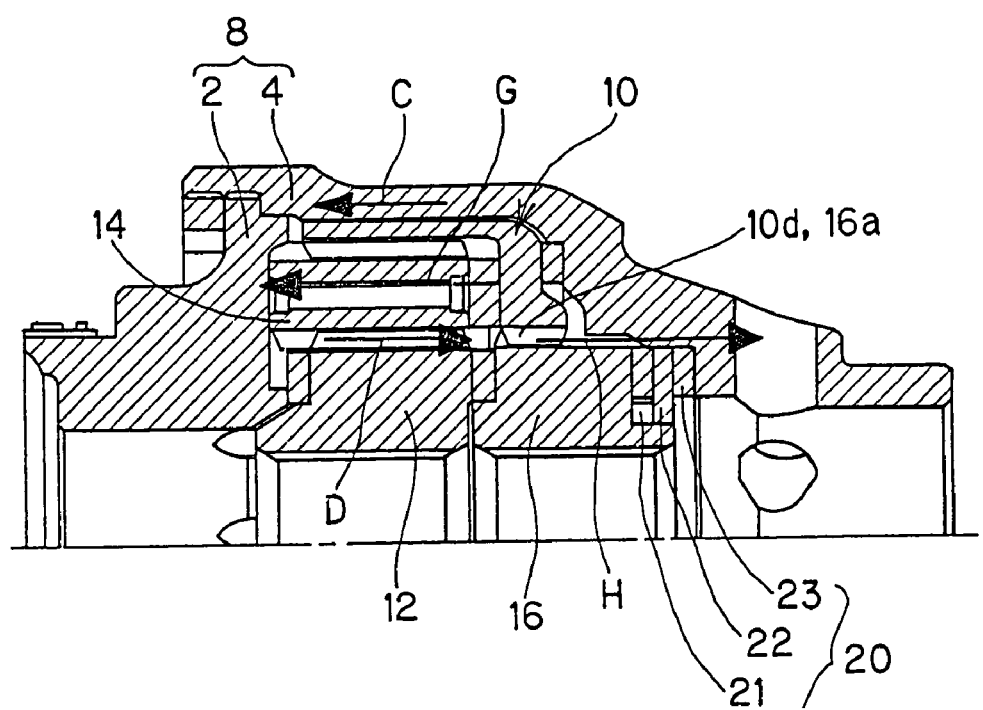
FIG. 7 is a longitudinal section illustrating locations within the differential gearing for vehicle according to the embodiment where thrusts are developed during the coasting mode and directions in which the thrusts act.

During the coasting mode of the differential gearing for vehicle, the power transmission between the internal gear 10 and the coupling 16 through the helical splines 10*d* and 16*a* generates a thrust as indicated by an arrow G which acts upon the internal gear 10 and another thrust indicated by an arrow H which acts on the coupling 16, in addition to thrusts (refer arrows C and D shown in FIG. 7) which results from the meshing engagement between the planet gears 14 and the internal gear 10 and the meshing engagement between the planet gears 14 and the sun gear 12. In particular, in the present embodiment, since the clutch mechanism 20 comprising three washers 21, 22 and 23 is disposed between the coupling 16 and case 4, the thrusts indicated by the arrows D and H during the coast mode act on the clutch mechanism 20 to produce a greater frictional force, allowing a very high bias ratio to be obtained. Since the directions in which thrusts are developed are chosen so that the multiple-disk clutch acts only during the coasting mode, a specially high bias ratio can be obtained during the coasting mode where the front load is greater, allowing the reliability of the heavily loaded multiple-disk clutch to be improved.

In this embodiment, three washers 21, 22 and 23 are mounted between the end face of the coupling 16 and the internal surface of the case 4, allowing a very high bias ratio to be obtained. However, the clutch mechanism 20 comprising the three washers 21, 22 and 23 may be replaced by a single disk washer. If the single disk washer is employed, a higher bias ratio can be obtained in comparison to a conventional arrangement since a power transmission between the internal gear 10 and the coupling 16 is arranged to occur by using the helical splines 10*d* and 16*a* which are inclined in the opposite direction from the inclination of the teeth 10*a* of the internal gear 10.

Figure 8:
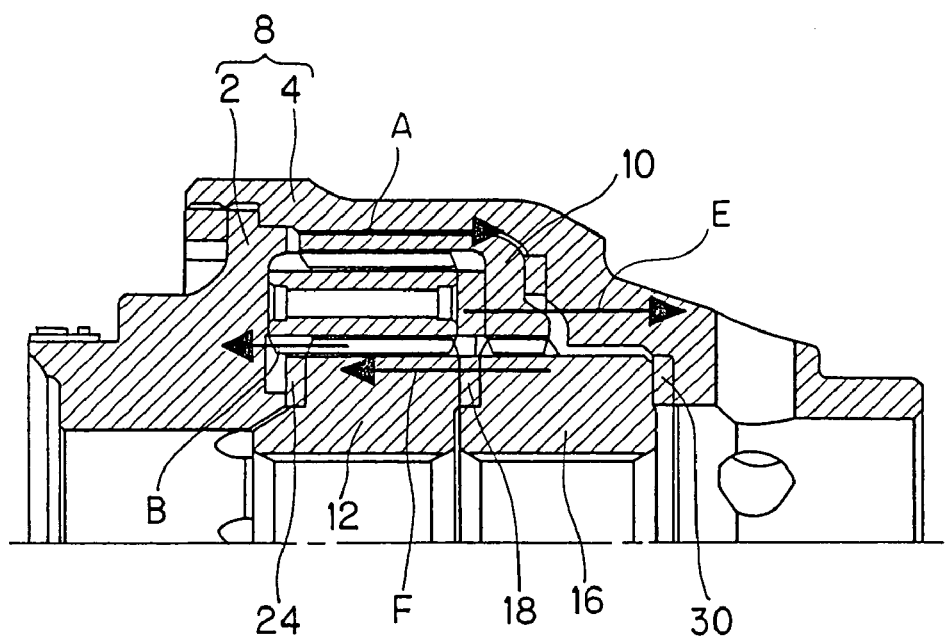
FIG. 8 is a longitudinal section illustrating locations within a differential gearing for vehicle according to another embodiment where thrusts are developed during the drive mode and directions in which the thrusts act.
Figure 9:
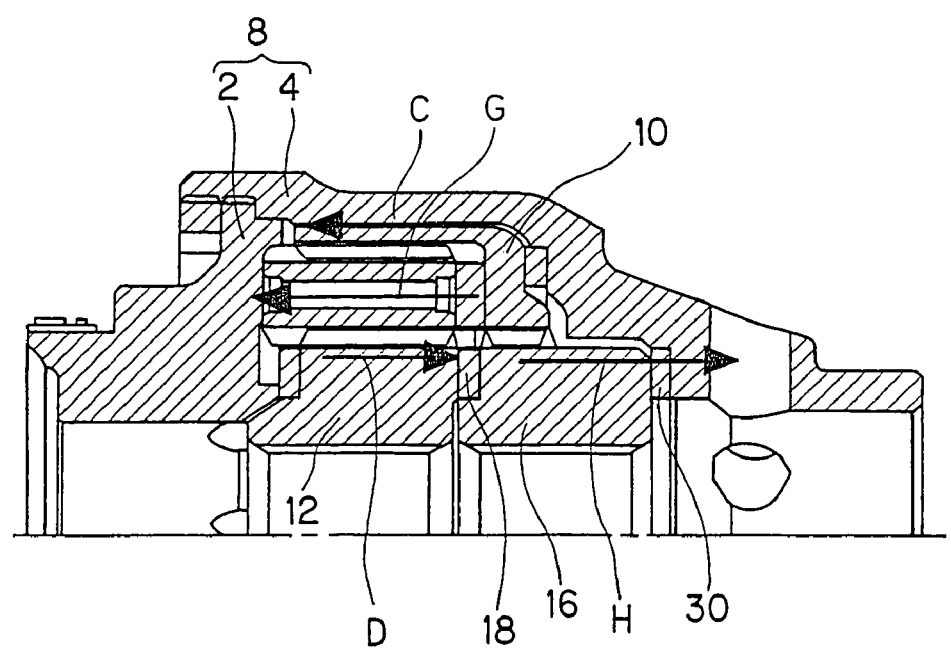
FIG. 9 is a longitudinal section illustrating locations within the differential gearing for vehicle according to the embodiment shown in FIG. 8 where thrusts are developed during the coasting mode and directions in which the thrusts act.

FIGS. 8 and 9 show a differential gearing for vehicle which includes a thrust generating mechanism by connecting the internal gear 10 and the coupling 16 together through the helical splines 10*d* and 16*a* for purpose of transmission in the similar manner as in the previous embodiment, but in which a single disk washer 30 is interposed between the coupling 16 and the internal surface of the case 4.

Figure 12:
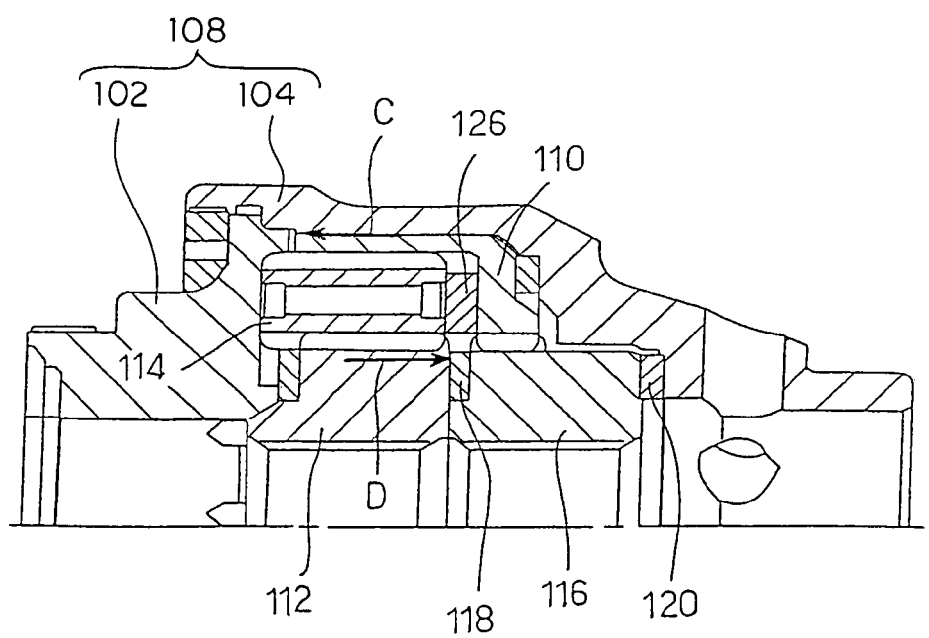
FIG. 12 is a longitudinal section of the conventional differential gearing for vehicle, illustrating locations where thrusts are developed during the coasting mode and directions in which the thrusts act.

In this embodiment also, during the drive mode (see FIG. 8), thrusts B and F acting on the coupling 16 and the sun gear 12 act on the washer 18 disposed between the coupling 16 and the sun gear 12 and also on the washer 24 disposed between the sun gear 12 and the planetary carrier 2, allowing thrusts to be obtained in the similar manner as in the arrangement shown in FIG. 6. On the other hand, during the coasting mode (see FIG. 9), thrusts D and H acting on the coupling 16 and the sun gear 12 act on the washer 18 disposed between the sun gear 12 and the planetary carrier 2 and the washer 30 disposed between the coupling 16 and the case 4, thus allowing a high bias ratio to be obtained in comparison to the conventional arrangement (FIG. 12) even though the frictional force obtained cannot be as high as in the previous embodiment (see FIG. 7).

Figure 10:
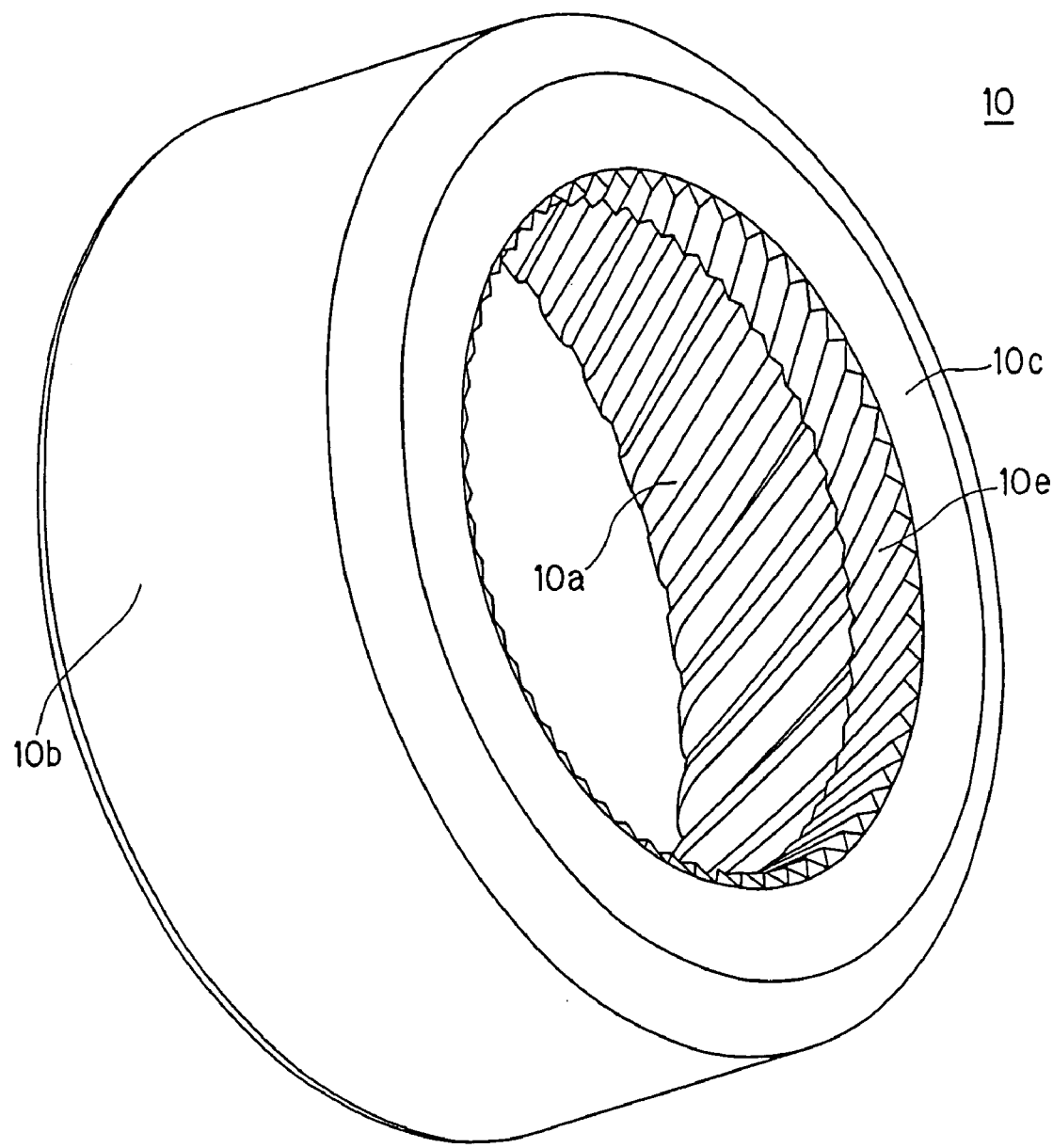
FIG. 10 is a perspective view of the internal gear of a differential gearing for vehicle according to a further embodiment.
Figure 11:
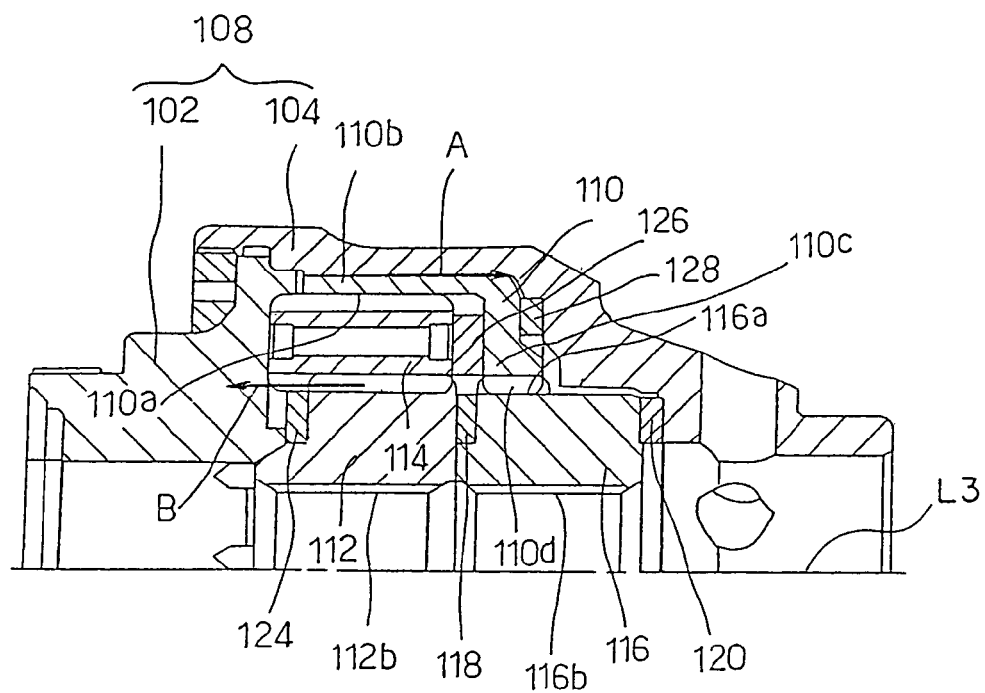
FIG. 11 is a longitudinal section of a conventional differential gearing for vehicle, also illustrating locations where thrusts are developed during the drive mode and directions in which the thrusts act.

In the first embodiment (see FIGS. 1 to 7) and the second embodiment (FIGS. 8 and 9), the splines 10*d* are inclined in the opposite direction from the inclination of the internal teeth 10*a* of the internal gear 10, and accordingly, the thrust A or C which results from the meshing engagement between the internal gear 10 and the planet gears 14 and the thrust E or G which results during the power transmission through the connection between the internal gear 10 and the coupling 16 are acting in the same direction, and thus the resultant thrust acting on the internal gear 10 is equal to the sum of individual thrusts A+E or C+G. However, when the helical splines 10*e* are inclined in the same direction as the internal teeth 10*a* of the internal gear 10 as shown in FIG. 10, the thrust which results from the meshing engagement between the internal gear 10 and the planet gears 14 act in the opposite direction from the thrust which is developed between the internal gear 10 and the coupling 16, whereby the resultant thrust can be reduced. In this manner, the provision of a separate thrust generating mechanism in addition to a conventional arrangement which develops a thrust allows the bias ratio to be not only increased, but also decreased, allowing the extent of adjustable bias to be significantly enlarged and thus allowing a desired characteristic to be achieved in a ready manner.

In the described embodiments, splines 10*d* and 10*e* are formed around the inner peripheral surface of the flange 10*c* which is located on the end of the internal gear 10 for connection with the coupling 16, but the new thrust generating mechanism need not be of a smaller diameter than the internal teeth 10*a* of the internal gear 10, and it is possible to provide a thrust generating mechanism of a diameter which is equal to or greater than the diameter of the internal teeth 10*a*. The thrust which results from the meshing engagement between the internal gear 10 and the planet gears 14 and which acts on the internal gear 10 as well as the thrust which is developed by the thrust generating mechanism disposed between the internal gear 10 and the coupling 16 and which acts on the internal gear 10 can be adjusted in magnitude by the helix angle of the helical gear teeth of the both gears 10 and 16, the inclination of the splines 10*d* and 16a, and the relative size of the diameters of the internal teeth 10a and splines 10d and 16a, allowing either thrust to be increased in magnitude.

In the described embodiments, the coupling 16 is connected to the internal gear 10, and the novel thrust generating mechanism (helical splines 10d and 16a) is disposed in the region of connection therebetween for transmitting the power from the internal gear 10 through the thrust generating mechanism. However, instead of the internal gear 10, the sun gear 12 may be divided into a member which meshes with the planet gear 14 and another member which transmits an output, and a thrust generating mechanism may be disposed between the both members.

What is claimed is:

1. A differential gearing for vehicle comprising an internal gear contained within a housing, a sun gear located inside of and concentric with the internal gear, planet gears disposed between the internal gear and the sun gear in meshing engagement with the both gears, and a planetary carrier for carrying the planet gears so as to be capable of rotating about an axis of rotation of the internal gear and the sun gear and rotation about the axes of the planet gears, the gears having helical gear teeth which are in meshing engagement with each other; in which along a power transmission path extending from a region of meshing engagement of the internal gear or the sun gear with the planet gears, one of the internal gear and the sun gear is divided into two or more members between the axis of rotation and the helical gear teeth of the one gear and a thrust generating mechanism which generates a thrust during the transmission is disposed in a region where the divided members are connected together.

2. A differential gearing for vehicle according to claim 1 in which the thrust generating mechanism is disposed in a region of connection between the internal gear member which meshes with the planet gears and a coupling member which includes a power transmission path.

3. A differential gearing for vehicle according to claim 2 in which the internal gear member and the coupling member are connected together through helical splines.

4. A differential gearing for vehicle according to claim 3, in which helical splines are inclined in the opposite direction from the helical gear teeth of the internal gear.

5. A differential gearing for vehicle according to claim 3, in which helical splines are inclined in the same direction as the helical gear teeth of the internal gear.

6. A differential gearing for vehicle according to claim 2, further comprising a multiple-disk clutch disposed between the coupling member and the housing.

7. A differential gearing for vehicle according to claim 6, in which an arrangement is made so that a direction in which the thrust is developed is chosen so that the multiple-disk clutch is active only during a coasting mode.

* * * * *